(12) United States Patent
Maeda

(10) Patent No.: US 7,878,739 B2
(45) Date of Patent: Feb. 1, 2011

(54) CUBIC BORON NITRIDE RADIUS END MILL

(75) Inventor: Kazuo Maeda, Itami (JP)

(73) Assignee: Sumitomo Electric Hardmetal Corp., Hyogo (JP)

( * ) Notice: Subject to any disclaimer, the term of this patent is extended or adjusted under 35 U.S.C. 154(b) by 121 days.

(21) Appl. No.: 12/415,552

(22) Filed: Mar. 31, 2009

(65) Prior Publication Data
US 2009/0245946 A1    Oct. 1, 2009

(30) Foreign Application Priority Data
Mar. 31, 2008    (JP) .............................. 2008-089864

(51) Int. Cl.
*B23P 15/28*    (2006.01)
*B23B 27/00*    (2006.01)

(52) U.S. Cl. ....................................... 407/119; 428/698

(58) Field of Classification Search ......... 407/113–116, 407/32, 53, 119; 408/144, 145; 428/698
See application file for complete search history.

(56) References Cited

U.S. PATENT DOCUMENTS

| 5,115,697 A * | 5/1992 | Rodriguez et al. ......... 76/108.6 |
| 5,685,671 A * | 11/1997 | Packer et al. .................. 407/54 |
| 5,868,885 A * | 2/1999 | Crockett et al. .......... 156/89.27 |
| 7,758,287 B2 * | 7/2010 | Alm et al. .................... 407/113 |
| 2002/0127068 A1 * | 9/2002 | Kinukawa et al. ........... 407/113 |
| 2007/0253787 A1 * | 11/2007 | Ishii ........................... 407/113 |

FOREIGN PATENT DOCUMENTS

JP    2005118960 A    5/2005

\* cited by examiner

*Primary Examiner*—Will Fridie, Jr.
(74) *Attorney, Agent, or Firm*—Ditthavong Mori & Steiner, P.C.

(57) ABSTRACT

A cubic boron nitride radius end mill includes a sintered cubic boron nitride compact bonded to an end of a main body, and a cutting edge provided on the sintered cubic boron nitride compact. The wedge angle θt of the cutting edge is constant over the entire region of the cutting edge. A negative rake face is disposed on a face so as to extend over the entire region of the cutting edge, and the rake angle θn of the negative rake face satisfies the relationship $-30° \leq \theta n \leq -50°$. A joint cutting edge is disposed between an end cutting edge and a radius cutting edge in the cutting edge, the joint cutting edge having a concave angle γ0 which is smaller than the concave angle γ1 of the end cutting edge and which satisfies the relationship $0.5° \leq \gamma 0 \leq 2°$.

6 Claims, 3 Drawing Sheets

CUBIC BORON NITRIDE RADIUS END MILL

BACKGROUND OF THE INVENTION

1. Field of the Invention

The present invention relates to a cubic boron nitride radius end mill used for machining of medium or high hardness materials, such as quench-hardened steel, and finish-machining of die surfaces and the like. The term "cubic boron nitride radius end mill" refers to an end mill having a cutting edge composed of a sintered cubic boron nitride compact.

2. Description of the Related Art

An example of a cubic boron nitride radius end mill according to the related art is described in Japanese Unexamined Patent Application Publication No. 2005-118960 (Patent Ref. 1). In a radius end mill disclosed in Patent Ref. 1, a cutting edge is an axially symmetrical, helical tooth in bottom view, and a chamfer (corresponding to a "negative rake face" in the present invention) with a negative angle is disposed on a face along the cutting edge.

The chamfer strengthens the edge. In a tool in which a sintered cubic boron nitride compact is used as a material for a cutting edge, the effectiveness of the chamfer is significant. However, even if the edge is strengthened by the chamfer, the depth of cut cannot be increased during cutting, and therefore, the effect of a helical tooth is not very large. In the case of machining of a high hardness material with an end mill composed of a sintered hard alloy, the surface of which is provided with a hard coating, the life of the end mill is short even at a small depth of cut, and the machined surface tends to be coarse due to the damage to the cutting edge. In order to cope with such problems, cubic boron nitride end mills have been developed. However, with respect to a cubic boron nitride radius end mill in which a quarter-circular radius cutting edge (corner cutting edge) is continuously connected to the outer end of an end cutting edge, and a peripheral cutting edge is continuously connected to the outer end of the radius cutting edge, even if the edge is strengthened by a chamfer, the desired end mill life may not be obtained in some cases.

SUMMARY OF THE INVENTION

In machining with a cubic boron nitride radius end mill, in particular, in machining of flat surfaces, the boundary between the radius cutting edge and the end cutting edge is easily damaged, which prevents improvement in the life of the end mill. In machining of flat surfaces, a load concentrates on the boundary between the radius cutting edge and the end cutting edge, resulting in occurrence of abrasion and chipping in the boundary. This may cause damage to the cutting edge, thus shortening the life of the end mill.

Under these circumstances, an attempt was made to optimize the rake angle of a negative rake face to be attached to the edge portion. However, it was found that there was a limit to the effect of strengthening the edge by the attachment of the negative rake face, and it was not possible to suppress damage to the boundary only by optimization of the rake angle of the negative rake face.

It is an object of the present invention to provide a cubic boron nitride radius end mill in which the resistance to fracture and abrasion resistance at the boundary between the end cutting edge and the radius cutting edge are enhanced so that the life of the end mill is improved.

A cubic boron nitride radius end mill according to the present invention includes a sintered cubic boron nitride compact bonded to an end of a main body and a cutting edge provided on the sintered cubic boron nitride compact, in which a negative rake face is disposed on a face so as to extend over the entire region of the cutting edge, the rake angle $\theta n$ of the negative rake face satisfies the relationship $-30° \leq \theta n \leq -50°$, the wedge angle $\theta t$ of the cutting edge is constant over the entire region of the cutting edge, and a joint cutting edge is disposed between an end cutting edge and a radius cutting edge in the cutting edge, the joint cutting edge having a concave angle $\gamma 0$ which is smaller than the concave angle $\gamma 1$ of the end cutting edge and which satisfies the relationship $0.5° \leq \gamma 0 \leq 2°$.

In the cubic boron nitride radius end mill, preferably, the width W of the joint cutting edge satisfies the relationship $0.025\,D \leq W \leq 0.3\,D$ (wherein D is the diameter of the effective portion of the end mill), and preferably, the cutting edge is non-helical. Furthermore, the joint cutting edge may have a linear shape, a circular shape, or a shape in which a plurality of lines and circular arcs are combined.

Preferably, the wedge angle $\theta t$ is a constant value in the range satisfying the relationship $100° \leq \theta t \leq 125°$.

In the radius end mill according to the present invention, the rake angle $\theta n$ of the negative rake face, which is disposed on the face so as to extend over the entire region of the cutting edge, is set in the range of $-30°$ to $-50°$. The cutting edge is strengthened by such optimization of the negative rake face. In the case where only the optimization of the rake angle of the negative face is performed, a problem remains in that the boundary between the end cutting edge and the radius cutting edge is damaged. However, in the present invention, the joint cutting edge is disposed between the end cutting edge and the radius cutting edge, the joint cutting edge having a concave angle $\gamma 0$ which is smaller than the concave angle $\gamma 1$ of the end cutting edge. Consequently, the area of the region on which the load easily concentrates when a flat surface is subjected to machining increases. This disperses the load, and thus the damage to the boundary between the end cutting edge and the radius cutting edge is expected to be suppressed.

Furthermore, the cutting edge is non-helical, and the wedge angle $\theta t$ of the cutting edge is constant over the entire region of the cutting edge. Consequently, the end cutting edge, the radius cutting edge, and the peripheral cutting edge are smoothly connected to each other, resulting in improvement in radius accuracy (form accuracy of the radius cutting edge).

The rake angle $\theta n$ of the negative rake face is the value set in consideration of the balance between the resistance to fracture of the edge portion and cutting quality. By setting the negative rake angle of the negative rake face to be larger than $-30°$, the effect of strengthening the edge by the negative rake face can be sufficiently obtained. On the other hand, by setting the negative rake angle to be smaller than $-50°$, the cutting quality is prevented from degrading.

Furthermore, by setting the concave angle $\gamma 0$ of the joint cutting edge to be slightly larger than $0°$, the joint cutting edge and the end cutting edge can be connected to each other smoothly. Moreover, it is possible to expect a wiper effect by the joint cutting edge, resulting in improvement in surface roughness of the machined surface. The concave angle $\gamma 0$ of the joint cutting edge is preferably in the range of $0.5°$ to $2°$. It is also possible to suppress the damage to the boundary by setting the concave angle ($\gamma 1$ in FIG. 5) of the end cutting edge so as to satisfy the relationship $0.5° \leq \gamma 1 \leq 2°$. However, in such a method, since the cutting load becomes excessive, chatter vibration occurs during machining, and the tool life is shortened.

In the cubic boron nitride radius end mill in which the width W of the joint cutting edge satisfies the relationship $0.025\,D \leq W \leq 0.3\,D$, the width W can be set larger than the typical feed per tooth in finish-machining. By maintaining this condition, it is possible to obtain the wiper effect by the joint cutting edge, and thus improvement in the surface roughness of the machined surface can be expected. The numerical range of 0.025 D≦W≦0.3 D is determined on the basis of general machining conditions.

In the cubic boron nitride radius end mill in which the cutting edge is non-helical, the negative rake face can be formed with high workability, and radius accuracy is easily ensured.

Furthermore, by setting the wedge angle θt at 100° or more, sufficient strength of the edge portion is ensured. By setting the wedge angle θt at 125° or less, appropriate cutting quality of the edge portion is ensured.

DETAILED DESCRIPTION OF THE INVENTION

Figure 1:
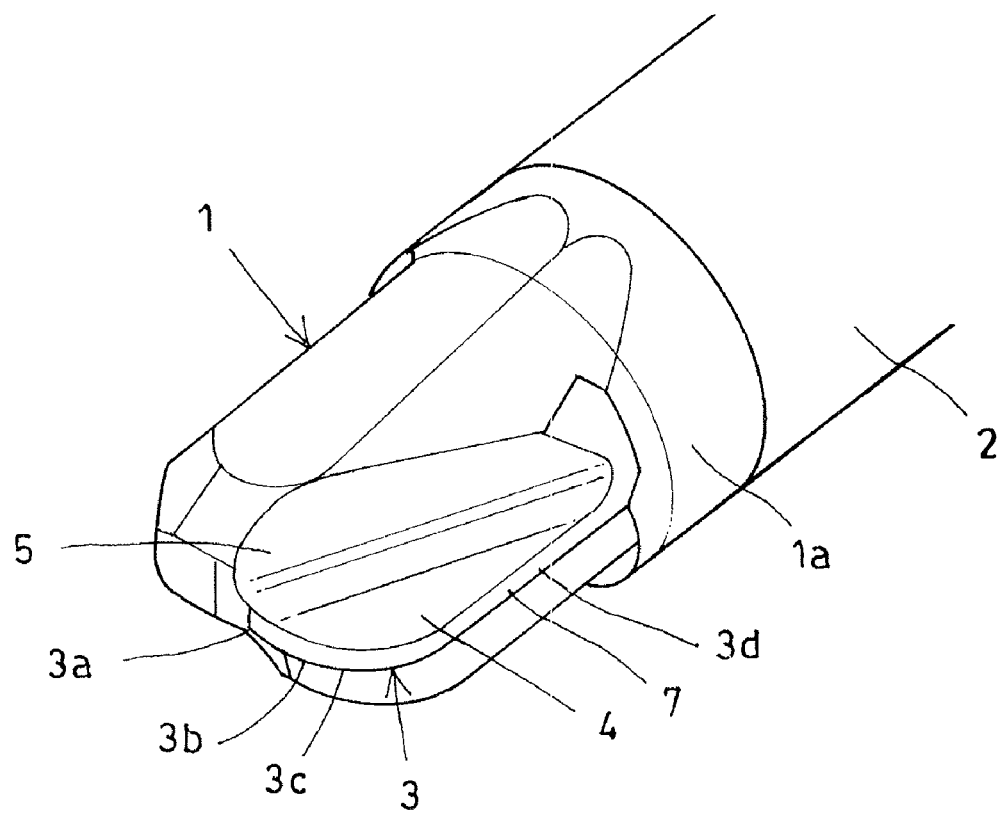
FIG. 1 is a perspective view which shows a substantial part of a cubic boron nitride radius end mill according to an embodiment of the present invention.
Figure 2:
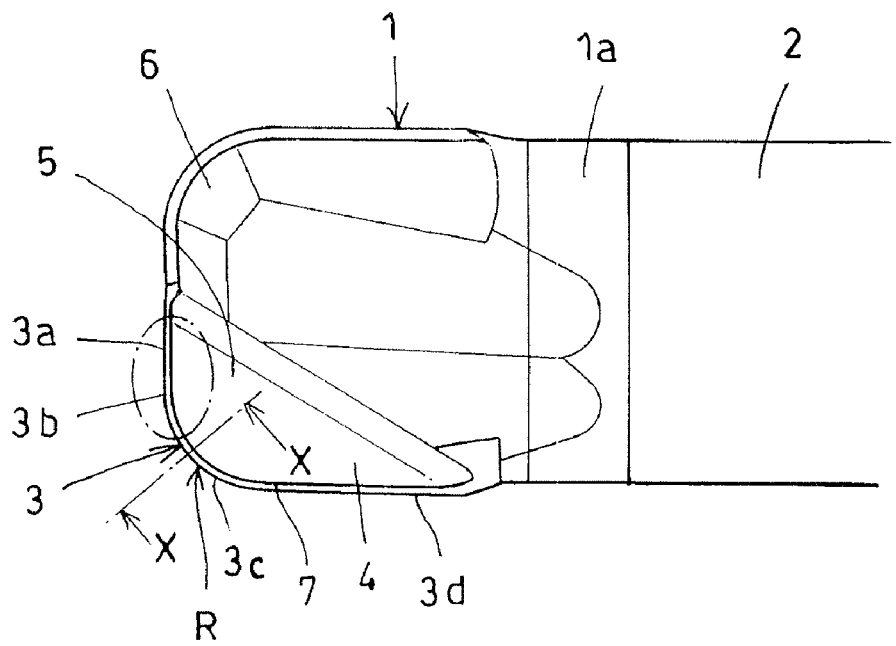
FIG. 2 is a front view of the substantial part the radius end mill shown in FIG. 1.
Figure 3:
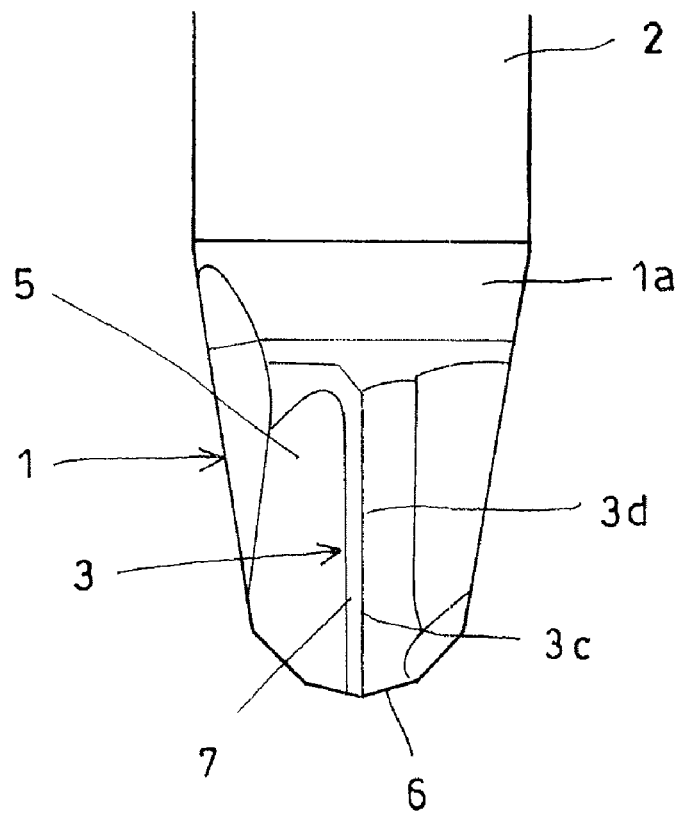
FIG. 3 is a side view of the substantial part the radius end mill shown in FIG. 1.

A cubic boron nitride radius end mill according to an embodiment of the present invention will be described with reference to FIGS. 1 to 6. In FIGS. 1 to 4, reference numeral 1 represents a sintered cubic boron nitride compact. The sintered cubic boron nitride compact 1 has a metal base 1$a$ composed of a sintered hard alloy which has been integrated into cubic boron nitride during production of the material. When the metal base 1$a$ is brazed on the end of a main body 2, the sintered cubic boron nitride compact 1 is bonded to the main body 2. The main body 2 has a shank (not shown) on the rear end thereof, the shank having a larger diameter than the main body. The sintered cubic boron nitride compact 1 contains 40% to 95% of cubic boron nitride, and the composition of the remainder is the binder layer.

Figure 4:
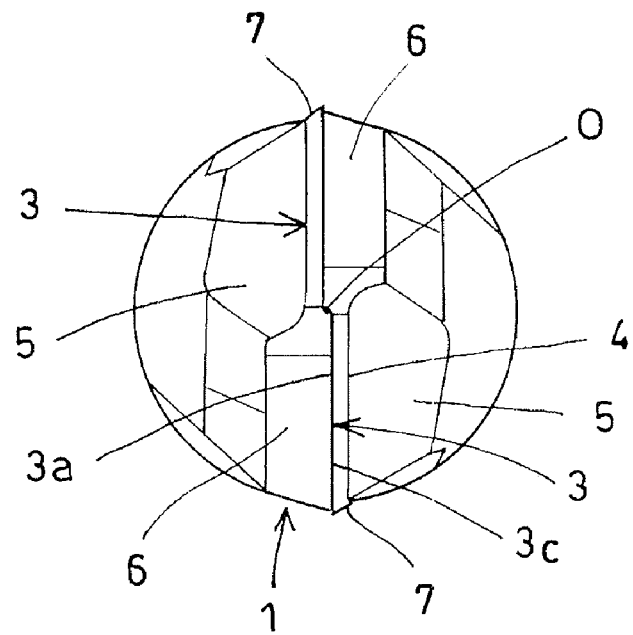
FIG. 4 is a bottom view of the radius end mill shown in FIG. 1.
Figure 5:
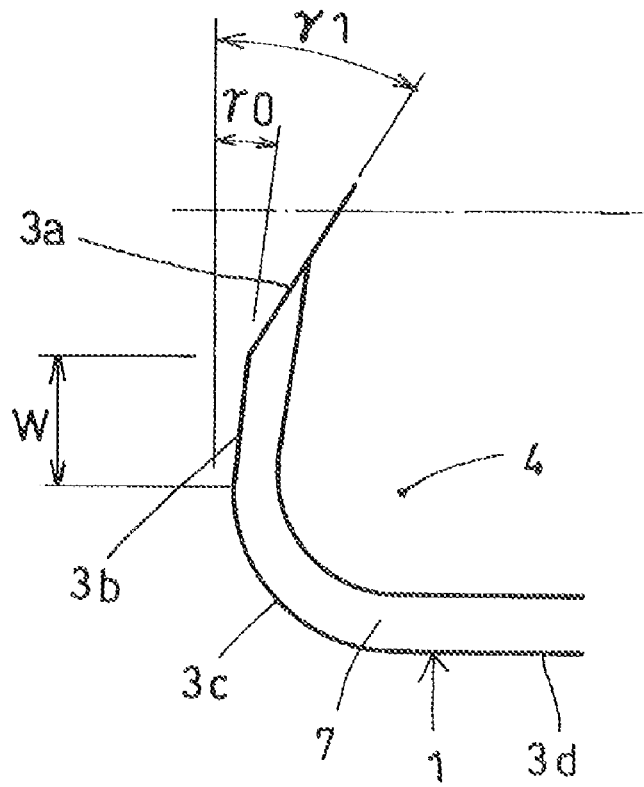
FIG. 5 is a schematic view showing a joint cutting edge.

The sintered cubic boron nitride compact 1 includes two non-helical cutting edges 3, faces 4, chip pockets 5, flanks 6, and negative rake faces 7 of the respective cutting edges in a centrally symmetrical form in bottom view (refer to FIG. 4).

Each cutting edge 3 is composed of four portions: an end cutting edge 3$a$, a joint cutting edge 3$b$, a quarter-circular radius cutting edge 3$c$, and a peripheral cutting edge 3$d$. The joint cutting edge 3$b$, which is one of the characterizing elements of the present invention, is disposed between the end cutting edge 3$a$ and the radius cutting edge 3$c$. The concave angle γ0 of the joint cutting edge 3$b$ (shown in FIG. 5) is smaller than the concave angle γ1 of the end cutting edge 3$a$ and is set in the range of 0.5° to 2°. The width W of the joint cutting edge 3$b$ (shown in FIG. 5) satisfies the relationship 0.025 D≦W≦0.3 D (wherein D is the diameter of the effective portion of the end mill).

The peripheral cutting edge 3$d$ is continuously connected to the outer end of the radius cutting edge 3$c$. The peripheral cutting edge 3$d$ is back-tapered as required.

Figure 6:
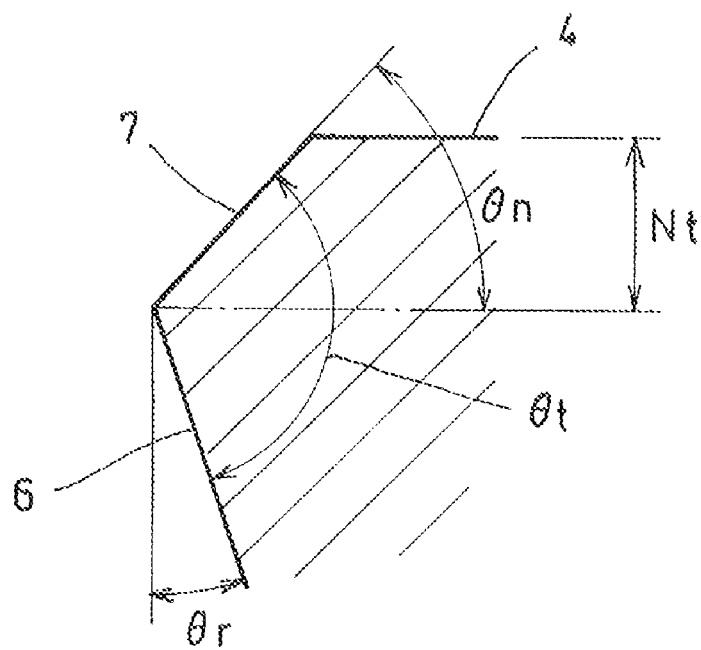
FIG. 6 is an enlarged cross-sectional view taken along the line X-X of FIG. 2.

The negative rake face 7 is disposed on the face 4 so as to extend over the entire region of the cutting edge 3. The rake angle θn of the negative rake face 7 (shown in FIG. 6) is set at a constant value in the range of −30° to −50°, and the wedge angle θt is set at a constant value over the entire region of the cutting edge. The wedge angle θt can be calculated from the equation θt=(90°−θr+θn). In FIG. 6, Nt represents the height from the center at the face. The optimum value of the clearance angle θr is 15° to 20°.

The edge of the cutting edge 3, i.e., the ridge at the position where the negative rake face 7 and the flank 6 intersect with each other, lies on the line substantially passing through the tool center O in the bottom view of the tool (FIG. 4), and thus the shape of the radius cutting edge 3$c$ in the front view of the tool (FIG. 2) is directly transferred to a workpiece. Therefore, in three-dimensional machining, high radius accuracy (form accuracy of the radius cutting edge 3$c$) is required.

In order to meet the requirement, each of the rake angle θn of the negative rake face 7 and the wedge angle θt of the cutting edge is set to be constant. In such a manner, the end cutting edge 3$a$, the joint cutting edge 3$b$, the radius cutting edge 3$c$, and the peripheral cutting edge 3$d$ are smoothly connected to each other, thus enhancing the form accuracy.

In machining of flat surfaces, by setting the tool feed per tooth smaller than the width W of the joint cutting edge 3$b$, a wiper effect by the joint cutting edge 3$b$ (i.e., a phenomenon in which the peak of the feed mark caused in machining with the radius cutting edge 3$c$ is scraped away by the joint cutting edge 3$b$) occurs, resulting in improvement in the surface roughness of the machined surface.

In order to confirm the effect of the present invention, cubic boron nitride radius end mills of Sample numbers 1 to 5 shown in Table were experimentally produced, and a performance evaluation test was conducted. In each sample, the diameter of the effective portion is 2 mm, the radius R is 0.5 mm, the neck length is 6 mm, the shank diameter is 4 mm, and the concave angle γ1 of the end cutting edge is 5°. The samples differ in terms of the rake angle of the negative rake face, the clearance angle, the presence or absence of a joint cutting edge, etc. Each of Sample numbers 1 to 3 has a joint cutting edge with a concave angle γ0 of 0.5° and a width W of 0.1 mm. Sample numbers 4 and 5 do not have such a joint cutting edge.

TABLE

| Sample No. | Rake angle of negative rake face (°) | Clearance angle θr (°) | Wedge angle θt (°) | Remarks |
| --- | --- | --- | --- | --- |
| 1 | −50° | 15° | 125° | Inventive product |
| 2 | −30° | 15° | 105° | Inventive product |
| 3 | −65° | 15° | 140° | Comparative product |
| 4 | −65° | 20° | 135° | Comparative product |
| 5 | −65° | 25° | 130° | Comparative product |

A workpiece was machined by a machining center in which each sample was individually mounted on the main shaft thereof. The machining conditions were as follows.

Workpiece: alloy tool steel (SKD11:60HRC)

Cutting conditions: maximum effective cutting speed: Vc 126 m/min (number of rotations n=20,000 min$^{-1}$), feed per tooth fz: 0.01 mm/tooth (feed speed Vf=400 mm/min), depth of cut in axial direction ap=0.03 mm, pick feed ae=0.7 mm, oil mist used.

Machining mode: machining of flat surface

The evaluation was performed by checking damage to the cutting edge at cutting lengths of 3.5 m and 10.5 m. The results show that in each of inventive products of Sample numbers 1 and 2, the cutting edge was in good condition at the cutting length of 3.5 m and at the cutting length of 10.5 m, and the amount of abrasion of the cutting edge was small. In particular, in Sample number 2, the cutting edge had a property similar to that in the initial state even at the cutting length of 10.5 m.

In contrast, in Sample number 3, no particular problem was observed at the cutting length of 3.5 m. However, at the cutting length of 10.5 m, crater abrasion occurred in the face in the vicinity of the boundary between the radius cutting edge and the joint cutting edge. The reason for the abrasion is believed to be that the negative rake angle of the negative rake face is excessively large. In Sample number 4, the cutting edge in the boundary between the radius cutting edge and the joint cutting edge was significantly fractured at the cutting length of 10.5 m. The reason for this is the absence of the joint cutting edge. In Sample number 5, the cutting edge was significantly damaged at a cutting length of 7 m, and thus cutting was forced to be stopped. The reason for this is believed to be, in addition to the absence of the joint cutting edge, that Sample number 5 had a larger clearance angle than Sample number 4, and thus the strength on the flank side was insufficient.

As is evident from the test results, in the radius end mill according to the present invention, by optimizing the negative rake face disposed on the face so as to extend over the entire region of the cutting edge and by disposing the joint cutting edge, the resistance to fracture of the cutting edge is improved and the life is prolonged. Furthermore, due to the wiper effect by the joint cutting edge, the surface roughness of the machined surface is improved.

What is claimed is:

1. A cubic boron nitride radius end mill having a cutting edge composed of sintered cubic boron nitride, comprising:
   a sintered cubic boron nitride compact bonded to an end of a main body; and
   the cutting edge provided on the sintered cubic boron nitride compact,
   wherein the wedge angle $\theta t$ of the cutting edge is constant over the entire region of the cutting edge,
   a negative rake face is disposed on a face so as to extend over the entire region of the cutting edge,
   the rake angle $\theta n$ of the negative rake face satisfies the relationship $-30° \leqq \theta n \leqq -50°$, and
   a joint cutting edge is disposed between an end cutting edge and a radius cutting edge in the cutting edge, the joint cutting edge having a concave angle $\gamma 0$ which is smaller than the concave angle $\gamma 1$ of the end cutting edge and which satisfies the relationship $0.5° \leqq \gamma 0 \leqq 2°$.

2. The cubic boron nitride radius end mill according to claim 1, wherein the cutting edge is non-helical.

3. The cubic boron nitride radius end mill according to claim 1, wherein the width W of the joint cutting edge satisfies the relationship $0.025 D \leqq W \leqq 0.3 D$ (wherein D is the diameter of the effective portion of the end mill).

4. The cubic boron nitride radius end mill according to claim 2, wherein the width W of the joint cutting edge satisfies the relationship $0.025 D \leqq W \leqq 0.3 D$ (wherein D is the diameter of the effective portion of the end mill).

5. The cubic boron nitride radius end mill according to claim 1, wherein the wedge angle $\theta t$ is a constant value in the range satisfying the relationship $100° \leqq \theta t \leqq 125°$.

6. The cubic boron nitride radius end mill according to claim 2, wherein the wedge angle $\theta t$ is a constant value in the range satisfying the relationship $100° \leqq \theta t \leqq 125°$.

* * * * *